United States Patent [19]

Huemmer et al.

[11] 4,025,548

[45] May 24, 1977

[54] RADIATION CURABLE OLIGOMERS

[75] Inventors: Thomas F. Huemmer; Bruce A. Edison, both of South Bend, Ind.

[73] Assignee: The O'Brien Corporation, South Bend, Ind.

[22] Filed: Feb. 4, 1974

[21] Appl. No.: 439,329

[52] U.S. Cl. .............................. 260/486 B; 260/836
[51] Int. Cl.$^2$ ........................................ C07C 69/54
[58] Field of Search ...................... 260/486 B, 836

[56] References Cited

UNITED STATES PATENTS

| | | | |
|---|---|---|---|
| 3,551,246 | 12/1970 | Bassemir et al. | 260/836 |
| 3,551,311 | 12/1970 | Nass et al. | 260/836 |

*Primary Examiner*—Paul J. Killos
*Attorney, Agent, or Firm*—Johnson, Dienner, Emrich & Wagner

[57] ABSTRACT

Oligomers produced by reacting low molecular weight epoxy compounds and low molecular weight monohydroxy vinyl compounds having at least one vinylic unsaturation, either in the form of vinyl groups, allylic, acrylic or methacrylic radicals attached thereto, wherein the resulting oligomers have more than one vinylic group per molecule.

15 Claims, No Drawings

RADIATION CURABLE OLIGOMERS

The present invention relates to novel oligomers which may be cured by high energy radiation, which oligomers are specifically adapted to use in the coating field, and to a method of making such oligomers. In particular, the oligomers of the present invention are the reaction products of certain low molecular weight epoxy compounds and certain low molecular weight mono-hydroxy vinyl compounds having at least one vinylic unsaturation, either in the form of vinyl groups, allylic, acrylic or methacrylic radicals attached thereto, wherein the resulting oligomers have more than one vinylic group per molecule. The oligomers may be applied as thin films, and cured extremely quickly, to develop superior properties as coating compositions. The oligomers may be used with or without reactive solvents.

BACKGROUND

The acrylic acid adducts of various epoxide materials have been described in various prior art patents. For example, U.S. Pat. No. 3,301,743 describes the acrylic acid adducts of epoxidized phenol-formaldehyde novolac resins, and an acrylic acid adduct of a diglycidyl ether of Bisphenol A is described in U.S. Pat. No. 3,317,465. Acrylic acid adduct of soy bean oil compositions is disclosed by Ackerman et al in U.S. Pat. No. 3,713,864. These patents describe compositions in which the acrylic groups are linked to the epoxy backbone material by an ester group, but fail to describe the ether linkage which results from the hydroxy-epoxide reaction and the variations available therefrom.

Among the requirements for the successful preparation of a radiation curable composition is a facile synthesis of the composition and the need for a minimum of inhibitor concentrations. Whereas the acrylic acid derivatives can be prepared, they often require extended heating, depending on the catalyst employed. Extended heating at 100° C. or greater can lead to the vapor phase polymerization of acrylic acid creating hazards and other synthetic difficulties. If the synthesis is not 100% complete, residual acrylic acid will be incorporated into the cured film which in certain coating applications is very undesirable.

The synthesis of the oligomers of the present invention is extremely rapid and fully controllable when carried out in the fashion disclosed in this specification. Further, residual reactants are hydroxyl bearing constitutents and are less objectionable when incorporated into the cured film. It is not uncommon to use hydroxyl compounds as reactive diluents for radiation curing systems. Lastly, the hydroxyl compounds are considerably less volatile than acrylic or methacrylic acid, thus minimizing vapor phase polymerization, odors and the like.

The novel products of the present invention offer superior radiation response with respect to film properties of coatings when compared to the acrylic acid-epoxide reaction products. The increased radiation response can be attributed to the multiplicity of radiation curable sites which can be achieved with the compositions of the present invention. Multiplicity of radiation curable sites are not possible with acrylic acid adducts mentioned in the prior art. The reaction of the hydroxy group with the epoxide group produces an ether linkage and it is postulated that the ether-type linkage has superior radiation response as compared to the ester-type linkage which results from an epoxide-acid reaction. The ether group is believed to affect the curing reaction [ref. Sonntag, C., Schuchmann, H., Schomburg, G., Tetrahedron 28 (16) 4333-9 (1972)]. Thus, increased line speeds and possible using the oligomers of the present invention. By proper selection of the hydroxyl vinyl compound, film flexibility can also be controlled without any sacrifice in the rapid radiation response. As a further manifestation of the ether linkage activity, quite surprisingly, is the observation that adhesion is enhanced with the compositions of the present invention, as compared to acrylic acid adducts.

THE PRESENT INVENTION

The present invention is based on the discovery that mono-hydroxy vinyl compounds containing radiation curable groups, such as hydroxy acrylate compounds, can be conveniently and quickly reacted with epoxy compounds to produce oligomers which cure readily under the influence of radiation. Further, it has been found that by using mono-hydroxy vinyl compounds containing a plurality of radiation sensitive vinyl groups, such as pentaerythritol triacrylate, that the radiation response of the resulting oligomer can be markedly increased, and that coating compositions made from the resulting oligomers have improved surface cure and surface mar resistance properties. Still further, it has been found that by using selected low molecular weight epoxy compounds, that radiation curable oligomers can be made which may be used without solvents as coating compositions. The elimination of solvents from the coating compositions results in many advantages since solvents, whether of conventional type or reactive types, tend to volatilize during the coating operation and thereby create an atmospheric pollution problem. Additionally, the volatilization of a convertible solvent has the effect of changing the viscosity of the uncured coating and affects the properties of the finished film.

THE EPOXY COMPOUND

The epoxy compounds which may be used in producing the oligomers of the present invention may be divided into mono-epoxy compounds, on one hand, and polyepoxide compounds on the other. Several representative mono-epoxy compounds are listed below. The polyepoxy compounds which may be used include the diglycidyl ethers of aromatic or aliphatic bis-hydroxyl compounds, the epoxidized phenol formaldehydenovolac resins, and the epoxidized oils (linseed oil, soybean oil, or other natural oils which may be epoxidized).

While the aliphatic-based epoxy compounds are generally preferred, the aromatics also may be used. Preferably, the polyepoxy compound contains little or no internal unsaturation of its own. The present invention further contemplates the use of halogenated epoxy compounds, as well as mixtures of epoxy compounds, to produce special types of materials for special purposes.

A partial list of epoxy compounds which may be used in the present invention is set forth below:

| EPOXIDE INTERMEDIATE | SOURCE | EEW RANGE | MW APPROX. | CLASSIFICATION |
|---|---|---|---|---|
| Butyl glycidyl ether | Dow | 130–149 | 130 | Aliphatic monoepoxide |
| Cresyl glycidyl ether | Dow | 165–189 | 165 | Aromatic monoepoxide |
| Cardura "E" | Shell | 240–250 | 245 | Aliphatic monoepoxide |
| Butylene oxide | Union Carbide | 72 | 72 | Aliphatic monoepoxide |
| Styrene oxide | Union Carbide | 120 | 120 | Aromatic monoepoxide |
| DER 332 | Dow | 172–176 | 350 | Aromatic polyepoxide |
| DER 331 | Dow | 182–190 | 370 | Aromatic polyepoxide |
| Epon 828 | Shell | 180–195 | 380 | Aromatic polyepoxide |
| Gen epoxy 175 | General Mills | 172–178 | — | Aromatic polyepoxide |
| Epon 826 | Shell | 175–190 | 365 | Aromatic polyepoxide |
| ERL 2772 | Union Carbide | 185–195 | — | Aromatic polyepoxide |
| Epon 830 | Shell | 190–198 | 390 | Aromatic polyepoxide |
| DEN 438 | Dow | 176–181 | 650 | Aromatic polyepoxide |
| DEN 732 | Dow | 305–335 | 640 | Aliphatic polyepoxide |
| Epon 812 | Shell | 150–170 | 480 | Aliphatic polyepoxide |
| DER 542 | Dow | 325–375 | — | Halogenated polyepoxide |
| EPO flexol plasticizer | Union Carbide | 228 | 1000 | Epoxidized oil |
| Epoxol 9-5 | Swift | 175 | 980 | Epoxidized oil |
| Flexibilizer 151 | P&G | 675 | — | Epoxidized oil |
| ERL 4221 | Union Carbide | 131–143 | 240 | Cycloaliphatic polyepoxide |
| ERL 4205 | Union Carbide | 91–102 | 172 | Cycloaliphatic polyepoxide |
| ERL 4206 | Union Carbide | 74–78 | 144 | Cycloaliphatic polyepoxide |
| ERL 4289 | Union Carbide | 205–216 | — | Cycloaliphatic polyepoxide |
| Epon 1002 | Shell | 600–700 | 1060 | Aromatic polyepoxide |
| Epon 1001 | Shell | 425–550 | 900 | Aromatic polyepoxide |
| Epon 834 | Shell | 230–280 | 470 | Aromatic polyepoxide |
| XD 7160 | Dow | 150–170 | 480 | Aliphatic polyepoxide |

The lower viscosity epoxy compounds, e.g., 5 cps, are generally preferred, since low viscosity oligomers result and such low viscosity oligomers require a lower proportion of solvent materials to form a practical coating composition. Higher viscosity epoxy compounds, e.g., up to about 100,000 cps may also be used. The molecular weight range of the useful epoxy compounds may run from about 70 to about 2000. However, the monoepoxide compounds preferably have molecular weights in the range of about 70 to about 250, with the epoxy equivalent weight necessarily being about the same as the molecular weight. The preferred molecular weight range for the difunctional polyepoxy materials generally runs from about 150 to about 600, with the preferred epoxy equivalent weights running from about 75 to about 300. The epoxidized oils, which are another preferred group of polyepoxy compounds, generally have molecular weights in the range of about 1000 to about 1500. Since epoxidized oils have functionalities which run between about 2 and 6, the epoxy equivalent weights for the epoxidized oils run between about 175 and about 750.

The functionality of the epoxy material used in preparing the oligomers of the present invention depends on many factors, including the molecular weight and molecular configuration of the epoxy compound, but the epoxy functionality must be sufficient to produce an oligomer which has a plurality of radiation curable groups thereon. Therefore if a mono-vinyl hydroxy compound is used, such as hydroxyethyl acrylate, it is essential that the epoxy compound have a functionality of at least 2. However, if a polyvinyl hydroxy compound is used, such as pentaerythritol triacrylate, the functionality of the epoxy compound can be less than 2.

The large number of epoxy compounds available which are useful in producing the oligomers of the present invention attest to the flexibility of the invention. The wide selection of epoxy compounds allows for molecular engineering of the oligomer to fit a variety of coating applications. It is also within the scope of the invention to use mixtures of epoxy compounds in order to achieve a balance of performance parameters.

RADIATION SENSITIVE HYDROXY VINYL COMPOUND

Under the infuence of the catalyst initiators, described below, the epoxide ring is opened. The hydroxyl vinyl compound reacts with the opened ring of the epoxide group and serves as a reaction terminator, while at the same time incorporating terminal or pendant radiation sensitive vinyl groups in each molecule. It is therefore, essential that the hydroxyl compound contain some vinyl unsaturation. Preferably this unsaturation is an acrylic function, although metacrylic, vinylic or allylic may be used for certain applications.

Generically, the hydroxy vinyl compounds takes the following form:

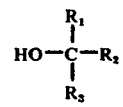

In the formula, the $R_1$, $R_2$, and $R_3$ groups are the same or different, and are selected from hydrogen or methylene units containing up to 8 carbon atoms. The methylene units may contain or be substituted with hetero atoms such as a halogen, nitrogen, sulfur and the like, but at least one of the $R_1$, $R_2$, or $R_3$ groups must contain radiation sensitive vinyl unsaturation. Thus the hydroxy vinyl compound may contain one, two or three groups containing vinyl unsaturation. However, it is essential that the hydroxy vinyl compound contain only one hydroxy group per molecule, otherwise a polymeric build up is likely.

The present invention further contemplates the production of radiation curable oligomers by reacting an epoxy compound with a mixture of more than one hydroxy vinyl compound. By combining a molecule of one degree of reactivity with one or more molecules of different degrees of reactivity, one can prepare an oligomer which will have any desired balance of properties upon curing. By use of this technique, the radiation responsiveness or cure properties may be adjusted through the use of increasing amounts of acrylate functionality. Thus, full control as to the radiation responsiveness and cure properties is possible over a wide range of epoxy compounds and over a wide range of epoxy equivalent weights.

By balancing the overall epoxy molecular weights, and the radiation sensitivity by adjusting the selection of $R_1$, $R_2$ and $R_3$ groupings, a degree of response control may be obtained which is not possible with similar acrylic acid-epoxy reaction products.

It is further contemplated in this invention that the $R_1$, $R_2$, and $R_3$ units may contain other functionality (other than vinyl radiation responsiveness) to some degree for specific purposes. As an example, an adhesion promoting group may be used (i.e., a silicone, carboxyl or the like), a flexibilizing group may be employed (an ether or long chain aliphatic group) or a rigidifying species may be inserted (a ring containing constituent). The amount of modification must of course be balanced with the desired radiation sensitivity, since it is incorporated at the expense of the radiation sensitive site. Again, at least one of the $R_1$, $R_2$, and $R_3$ groups must include vinyl unsaturation for radiation response.

A partial list of useful radiation sensitive monohydroxy vinyl compounds are:

allyl alcohol
crotyl alcohol
hydroxyethyl acrylate
hydroxypropyl methacrylate
hydroxyethyl methacrylate
1,3-butyleneglycol monomethacrylate
1-bromo-2-hydroxypropyl acrylate
hexandiol monoacrylate
neopentylglycol monoacrylate
trimethylolpropane diallyl ether
trimethylolpropane diacrylate
pentaerthyritol triacrylate
dipentaerythritol pentacrylate
N-methylolacrylamide
p-vinylbenzyl alcohol

THE REACTION

The hydroxy vinyl compounds are reacted with the epoxy compound, preferably by adding the epoxy compounds slowly to the hydroxyfunctional compound. Generally it is preferred that this reaction take place in the presence of a catalyst initiator, and that throughout the reaction the temperature be held to about 70° C. or less through the use of cooling baths and/or regulating the rate at which the epoxy compound is metered into the hydroxy vinyl compound.

In carrying out the reaction, solvents may be used in the reaction media or to reduce the viscosity of either of the reactants, so long as the solvent is non-participating in the synthesis of the reactive oligomer. While it is possible to premix a solvent and the hydroxy vinyl material, generally the epoxy compounds, which tend to be viscous, are more advantageously mixed with any solvents which may be used, and the solvent-epoxy mixture metered into the hydroxy functional compound.

If it is necessary or desired to use a solvent to carry out the reaction, it is preferred to use reactive (radiation curable) solvents, as opposed to non-reactive reaction solvents, since reactive solvents do not require removal in order to produce a 100% convertible composition. On the other hand, for some compositions, small amounts of non-reactive reaction solvents can be tolerated in the final product and therefore can be conveniently used as part of the reaction media. It has been found that the following reactive (radiation curable) solvents can be used as the reaction media: diethyleneglycol diacrylate, hexanediol diacrylate, 2-ethylhexyl acrylate, isodecyl acrylate, ethylene glycol diacrylate, neopentyl glycol diacrylate, trimethylolpropane triacrylate, and the like. Mixtures of these solvents may also be used.

In producing the oligomer it is generally preferred to use a stoichiometric equivalent amount of hydroxy vinyl compound so that all of the epoxy groups of the epoxy compound are reacted. It is sometimes advantageous to use a stoichiometric excess of hydroxyfunctional materials, since it permits a more complete reaction of the epoxy groups. Any excess hydroxy vinyl compounds are radiation sensitive and need not be removed from the coating composition. On the other hand, it is not generally desirable to use less than the stoichiometric amount of the hydroxy vinyl compound, since the excess epoxy compounds tend to homopolymerize in the presence of the catalyst initiators.

THE CATALYST-INITIATOR

The catalyst initiator fulfills the requirement for initiating the reaction of the epoxy compound through the ring opening type reaction. The useful initiators are strong Lewis acids that operate by means of a cationic mechanism. Since these initiators react rapidly with an epoxide function, the synthesis is facile if the proper reaction conditions are employed. Thus very little, if any, external heating is required, and the synthesis can be carried out with minimal inhibitor levels. The catalyst employed must be used in such a manner so as not to react with vinylic unsaturation nor should it add directly across the epoxy functionally. Since the catalysts are quite active, the reaction is complete in very short time periods; it is not uncommon for the synthesis to be completed in two hours or less depending upon the mass of the reaction and the heat transfer involved in the synthesis. Thus this synthesis is ideally suited to reactive solvent technology where minimal inhibitor contents are desirable for maximizing the cure speed of the final composition.

Typical catalyst initiators are the chelates of fluorinated boron compounds. The preferred catalyst is boron trifluoride etherate, although boron difluoride chelates may also be employed. A typical structure may be represented as:

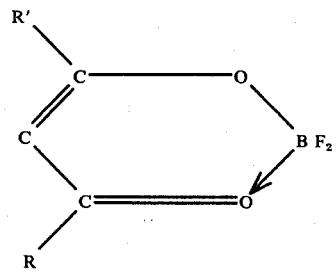

where R is methyl or propyl, and R' is methyl, phenyl amine, or isobutyl. It is also contemplated that $BF_2$ amine complexes or $BF_4$ amine salts can also be used from any one of several amines, e.g., n-hexylamine, benzyl amine or triethyl amine. Other cationic initiators which are useful in this invention are the borates, i.e., trietyloxoniumtetrafluoroborate, triethanolamineborate and, methyloxoniumtetrafluoroborate; also, trifluoroacetic acid, trichloroacetic acid, and tin tetrachloride are useful catalysts.

The concentration of catalyst initiator may vary from 0.01 to 2 percent by weight, based on the weight of the reactants, the exact percentage depending on the type and class of initiator used with the preferred range being 0.1 to 1 percent, by weight. Generally speaking the catalyst-initiators level has the overall effect of controlling the induction period of the reaction. Amines can be used to stop the reaction. It has also been reported that free amines can function as a cure accelerator.

The following examples serve to illustrate the production and curing of several radiation curable oligomers, but it is understood that these examples are set forth merely for illustrative purposes and many other oligomers are within the scope of the present invention.

EXAMPLE 1

Into a 250 ml flask equipped with a stirrer, condenser, addition funnel and thermometer were added the following:

116 grams 2-hydroxyethyl acrylate (1.0 mole)
3.4 grams borontrifluroide etherate (1%)
6.2 gram monomethylether of hydroquinone Into the addition funnel was added 228 grams of epoxidized soy bean oil (EEW 228). The epoxidized soy bean oil was added slowly with stirring over a 2 hour time interval and at such a rate that the reaction temperature did not exceed 75° C. After all the epoxidized soy bean oil had been added agitation was continued until the exotherm ceased. Then the composition was cooled to 50° C. An epoxy number of the composition was then taken and found to be 0.01 indicating approximately a 100% yield for the reaction.

The above reaction was twice repeated except that one mole of pentaerythritol triacrylate alone and one mole of a 50:50 molar mixture of pentaerythritol triacrylate and 2-hyroxyethyl acrylate was substituted for the mole of 2-hydroxyethyl acrylate used above to react with the epoxidized soy bean oil. The final products were then reduced in neopentylglycol diacrylate. All three derivatives were about 400 cps at 60% solids.

Each of the above products were then photo-sensitized with 4% benzophenone. Each product was applied to a filled and sanded particle board as a 1 mil film, which was then exposed to a 200 watt/inch medium pressure mercury vapor lamp. The response achieved with each product is shown below.

| Oligomer Type | Maximum Line Speed[1] for Tack Free Cure | Good Mar |
|---|---|---|
| 2-hydroxyethyl acrylate | 40 | 20 |
| 2 hydroxyethyl acrylate/PETA | 50 | 40 |
| PETA[2] | 60 | 50 |

[1]ft./min.
[2]pentaerthyritol triacrylate

EXAMPLE 2

Into a 500 ml three neck flask equipped with a stirrer, condenser, thermometer and addition funnel were added the following:

116 grams 2-hydroxyethyl acrylate (1.0 mole)
3.0 grams boron trifluoride etherate (1%)
0.1 gram hydroquinone Into the addition funnel was added 188 grams of Epon Resin 828. Epon Resin 828 is a light colored, epichlorohydrin/bisphenol A-type, low molecular weight epoxy resin having a typical average molecular weight of about 380 and an average epoxide equivalent weight of 188. This epoxy compound was then slowly added to the reaction flask at a rate such that the reaction temperature did not exceed 60° C. After the addition was complete the mixture was allowed to cool to 40° C. and the epoxy value of the reaction product determined, and was found to be 0.16, indicating at least 85% completion for the reaction. Two 50% solids solutions of the product were then produced using neopentylglycol diacrylate and 2-hydroxyethyl acrylate monomers as the two solvents.

The above reaction was then repeated using an equimolar amount of pentaaerthyritol triacrylate in place of 2-hydroxyethyl acrylate for the reactant with the Epon 828, and solids were adjusted with monomer solvents as indicated above.

After sensitizing the mixture with 2.5% benzophenone, one mil films were applied with a No. 16 wire rod to filled and sealed particle board. The mixture was cured using two medium pressure mercury vapor lamps. The resulting data appears below:

| Adduct Type | Solvent | Maximum Line Speed for Tack Free Cure | Good Mar |
|---|---|---|---|
| HEA | HEA | 45 | 40 |
| PETA | HEA | 70 | 55 |
| HEA | NPGDA | 35 | 25 |
| PETA | NPGDA | 50 | 40 |

EXAMPLE 3

Into a 500 ml three neck flask equipped with a stirrer, condenser, addition funnel and thermometer were placed the following:

144 grams hydroxypropyl methacrylate (1.0 mole)
3.2 grams triethyloxonium tetrafluoroborate (1%)
0.15 gram monomethylether of hydroquinone Into the addition funnel was placed 178 grams of DEN 438 (EEW 178) dissolved in 210 grams of methyl cellosolve acrylate monomer. The DEN 438 is an epoxy novolac resin having an epoxy functionality of about 3.6 and a viscosity of 35,000–70,000 CPS at 125° F. This epoxy solution was then slowly added to the reaction flask at a rate such that the reaction mixture did not exceed 75° C. At the completion of the reaction the temperature dropped to 40° C.; then the reaction mixture was gently warmed to 60° C. for 2 hours. The final epoxy number was determined and found to be 0.15 indicating greater than 90% completion for the reaction. The final product is a clear viscous material having a Gardner color of about 5 and a viscosity of about 100,000 cps at 40° C. The product was then reduced with 113 grams of trimethylolpropane trimethacrylate to the 50% solids level.

The product solution was photosensitized with:
a. 2% benzophenone
b. 3% benzoinbutyl ether A 1 mil film of the coating was applied with a No. 16 wire rod to a filled and sealed particleboard, and cured with two medium pressure mercury lamps to yield a cured film which was tack free at a speed of 20 ft./min. The cured film survived over 100 double acetone rubs and had a sward hardness of 26.

EXAMPLE 4

Into a 500 ml three neck flask equipped with a stirrer, condenser, thermometer and addition funnel were added the following:

58.1 grams allyl alcohol (1.0 mole)
1.4 grams boron trifluoride etherate
0.12 hydroquinone Into the addition funnel was then placed 87 grams of DER 332 (EEW 174) premixed with 84 grams of Epoxol 9-5 (EEW 176). As is set forth in the table, DER 332 is an aromatic polyepoxide of about 350 molecular weight having an epoxy equivalent weight specification of from 172 to 176. The Epoxol 9-5 is an epoxidized oil having a molecular weight of about 980 and an epoxy equivalent weight specification of about 175. The epoxy derivatives were then added slowly while maintaining the reaction temperature less than 50° C. After all the epoxy derivatives were added 50 grams of butyl acrylate and 50 grams of 2-hydroxyethyl acrylate were added and agitation was continued for an additional 4 hours. The final epoxy number was determined and found to be 0.01 indicating that the reaction was nearly 100% complete.

The above mixture was photosensitized with 2% benzophenone and 3% napthalene. Then 0.5 mil films were applied by means of a wire rod on Bonderite 37 substrate and cured using a 5 second exposure to a low pressure mercury vapor lamp followed by a 10 second exposure to a medium pressure mercury vapor lamp. The film cured tack free, survived greater than 50 acetone rubs, and was able to withstand 60 in.-lbs. of reverse impact.

EXAMPLE 5

Into a 500 ml three neck flask equipped with a stirrer, condenser, thermometer and addition funnel were added the following:

50 grams 2-hydroxyethyl acrylate (0.5 mole)
149 grams pentaerthyritol triacrylate (0.5 mole)
1.8 grams triethanol amine borate (0.5%)
0.1 gram monomethyl ether of hydroquinone Then into the addition funnel was placed 159 grams of ERL 4289 (EEW 159) reduced with 200 grams of 1,8-hexane diol diacrylate. ERL 4289 is a cycloaliphatic polyepoxide having an epoxy equivalent weight specification of from 205 to 216. This epoxy solution was then added slowly under mild agitation such that the temperature never exceeded 65° C. Following the complete addition of the epoxy compound the temperature was maintained at 65° C. for an additional 2 hours using external heating. Finally, the epoxy number was determined and found to be 0.09 indicating greater than 95% completion for the reaction. The reaction product was then reduced with 166 grams of hexanediol diacrylate monomer.

The above reaction product was then mixed with 2% of 2,2-dimethoxy-2-phenylacetophenone photosensitizer. A 1 mil film was applied to a glass substrate using a wound wire rod and cured under a nitrogen atmosphere with a low pressure mercury vapor lamp at a distance of 6 inches. After a 2.5 second exposure a tough tack free film was obtained which survived 85 double acetone rubs and had a sward hardness of 36.

EXAMPLE 6

Into a 500 ml flask equipped with a stirrer, condenser, addition funnel and thermometer were added the following:

50.5 grams N-methylolacrylamide (0.5 mole)
65.1 grams 2-ethylhexanol (0.5 mole)
3.0 grams borontrifluoride etherate (1%)
0.18 gram hydroquinone Into the addition funnel was then placed 188 grams of Epon 828 (EEW 188) dissolved in 128 grams of butyl acrylate monomer. the epoxy solution was added slowly under agitation such that the reaction temperature never exceeded 70° C. After all the epoxy solution was added, the reaction mixture was strirred for another 2 hours and finally reduced with 176 grams of neopentyl glycol diacrylate monomer. The final epoxy number was then determined and found to be 0.02 indicating approximately 100% completion for the reacton. The final acid number was also determined and found to be 6.2. The reaction product was then neutralized with an excess of methyl diethanol amine (15 grams).

The reaction product was then mixed with 3% benzophenone in order to photosensitize the mixture. A 2 mil film was then applied to aluminum substrate by means of a wound wire rod and the film exposed to two 200 watt/inch medium pressure mercury vapor lamps at a distance of 2 inches. The sample cured tack free at a speed of 15 ft./min. The cured film passed a 180° wedge bend test as well as a cross hatch adhesion test.

EXAMPLE 7

A 1 liter, 3-neck flask was equipped with a stirrer, a thermometer and an addition funnel. Into the flask was placed the following materials:

244.2 grams hydroxyethyl acrylate
0.38 gram para-methoxyphenol
376.2 grams neopentylglycol diacrylate
2.0 grams boron trifluoride etherate To this mixture was slowly added 320 grams of Dow XD-7160 (polyglycidyl ether of glycerine, EEW 150–170, which is essentially aliphatic in nature). The temperature increased from 24° C. to 60° C. over a 2 hour period. The final epoxy number was found to be 0.18 and the final viscosity was 330 cps.

The resulting oligomer was photosensitized and applied without dilution to a filled particle board substrate. The coating was cured at 110 feet/minute, 130 feet/minute, and 160 feet/minute under ultraviolet lights. In all cases a tack-free cure was obtained. The two lower speeds gave excellent mar resistance while only fair mar resistance was obtained at the hightest speed.

EXAMPLE 8

A 500 ml, 3-neck flask was equipped with a thermometer, a stirrer and an addition funnel. Into the flask was placed the following materials:

244.2 grams hydroxyethyl acrylate
0.16 gram para-methoxyphenol
0.6 grams borontrifluoride etherate Under rapid agitation, 198 grams of ERL 4206 (a cycloaliphatic liquid epoxy having an EEW of 74–78 was added dropwise over a 3 hour period allowing the reaction flask temperature to rise no greater than 71° C. After cooling to room temperature the epoxy number was determined and found to be 0.075. This corresponds to a 99.1% completion of the reaction. The final viscosity was 55 cps at 25° C. and the molecular weight was calculated to be 372.0 The structure postulated for the oligomer is set forth below:

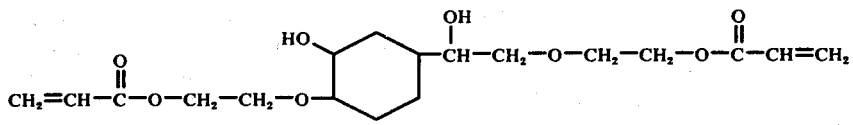

The oligomer of Example 8 was photosensitized with 4% methyldiethanol amine and 2% benzophenone. Talc was gradually added to the oligomer under high agitation using a high speed disperser. When the viscosity of the mixture reached 70,000 cps at 25° C., the talc addition was terminated. Agitation was continued for an additional 5 minutes in order to insure a uniform product. This material was applied to unsealed particle board as a filler-sealer by means of a commercial roll coater. Panels were cured with a 2 lamp, 5000 watt lamp source at a line speed of 100 feet/minute. The filler-sealer cured tack free, and sanded well. There was little or noresidual odor. Since no monomers were employed in the coating system, the handling hazards were minimal. There was essentially no volatility in the formulation at ambient temperatures, and therefore the product is considered to be 100% environmentally acceptable.

EXAMPLE 9

A 500 ml, 3-neck reaction flask was equipped with a stirrer, a dropping funnel and a thermometer. To the flask was added the followig materials:

152 g pentaerythritol triacrylate
0.088 g methylether of hydroquinone
0.4 m/ boron trifluoride etherate Seventy grams of butyl glycidyl ether was added dropwise to the flask over a 1 hour period during which the temperature increased to about 65° C. The final epoxy number was measured and found to be 0.018, indicating the reaction was nearly 100% complete. A clear, slightly colored liquid was obtained having a viscosity of approximately 430 cps at 25° C.

A filled and sealed particle board was overcoated with a catalized vinyl basecoat which was then cured. The product of Example 9 was photosensitized, and applied, as a top coat, to the particle board and cured using two ultraviolet lights, giving 200 watts per inch, in air, at 30 feet/minute, 60 feet/minute, and 100 feet/minute. In each case a tack-free cured film having good mar resistance was obtained.

COATING COMPOSITION

The oligomers, prepared as described above, may be used advantageously to produce coating compositions, as is illustrated in the foregoing examples. Preferably, the low molecular weight species of oligomers are used without solvents. Howver, when using the more viscous materials, or in applications which require a lower viscosity, reactive solvents are generally preferred. Among the reactive solvents which may be used to prepare the coating composition are neopentylglycol diacrylate, hydroxyethyl acrylate, styrene, alkyl acrylates having from one to carbon atoms in the alkyl group and the like. The radiation reactive solvents used in preparing the oligomers described above may similarly be used as solvents for the coating composition.

The coating compositions of the present invention may be used on various substrates, including both porous and non-porous substrate. The foregoing examples illustrate the application of the coating composition to filled and sealed particle board, but such substrates as wood, or wood products, plastics, glass, rubber, metal and the like also can be coated.

The oligomers of the present invention may be mixed with other resins to achieve various properties. For instance, epoxy resins, acrylic resins or other resins may be added to adjust the flow properties of the coating compositions. As was mentioned above, various solvents can be used to accomplish similar results. Conventional materials such as pigments, filler, leveling agents and the like can similarly be used in preparing coating compositions from the oligomers of the present invention. The coating compositions may be dyed or pigmented, although pigments require special handling with respect to ultraviolet curing operations.

It is contemplated that the oligomers and coating compositions produced in accordance with the present invention may be cured by various forms of radiation, including both ionizing radiation and actinic radiation. Those skilled in the art will be advised of the various types of electron beam apparatus which are presently available, and which may be used to cure the coatings of the present invention. Similarly, various types of ultraviolet apparatus are currently available, and as illustrated by the examples here and below, ultraviolet radiation may be used to cure the coating compositions of the present invention.

The coating compositions of the present invention may be cured in the presence of air, or in atmsopheres of reduced oxygen content. If inert gas atmospheres are employed, increased line speeds may be used, since the total energy requirement for curing is reduced. Further, the coatings cured in inert gas tend to have increased gloss, increased film toughness, and improved overall film properties. It is contemplated that the photosensitizer compsition used in coatings to be cured in inert atmospheres might be changed from those used in air curing coatings.

While the foregoing specification has been directed primarily to the use of epoxide, three member ring groups, and reactions where the epoxide ring is opened and reacted with the hydroxy vinyl compound, the present invention is not so limited. For instance, other ring structures can be similarly opened and reacted with the hydroxy vinyl compounds to produce radiation curable oligomers within the teachings of the foregoing disclosure. In addition to the epoxy-containing compounds, ring structures such as epi-sulfides, caprolactones, furans, dioxanes and azridinyl compounds can be reacted with hydroxy vinyl compounds to produce oligomers analogous to those specifically illustrated above.

Further, it is contemplated that the method of the present invention may be used to prepare reactive solvents, by reacting a mono-epoxide compound with a mono hydroxy-mono vinyl compound. For example, one may react mono glycidyl ether with hydroxy ethyl acrylate to produce such a reactive solvent.

The forms of invention herein shown and described are to be considered only as illustrative. It will be apparent to those skilled in the art that numerous modifications may be made therein without departure from the spirit of the invention or the scope of the appended claims.

What is claimed is:

1. A radiation-curable oligomer which comprises a prepolymer reaction product produced when an epoxy compound is cationically initiated in the presence of at least a stoichiometric equivalent amount of a vinyl mono-hydroxy terminator compound, wherein said epoxy compound has a molecular weight between 70 and 2000 and wherein said epoxy compound contains between 1 and 6 epoxy groups per molecule and wherein said prepolymer reaction product has a plurality of radiation sensitive vinyl groups and is substantially free of oxirane oxygen.

2. A radiation curable oligomer, as described in claim 1, wherein said polyepoxy material is approximately difunctional.

3. A radiation curable oligomer, as described in claim 2, wherein said epoxy compound has a molecular weight between about 150 and about 600.

4. A radiation curable oligomer, as described in claim 3, wherein polyepoxy difunctional compound has an epoxy equivalent weight between about 75 and 300.

5. A radiation curable oligomer, as described in claim 1, wherein the epoxy compound is an epoxidized oil having a functionality between about 2 and 6.

6. A radiation curable oligomer, as described in claim 5, wherein the epoxidized oil has an epoxy equivalent weight between about 175 and 750.

7. A radiation curable oligomer, as described in claim 1, wherein said vinyl mono-hydroxy compound contains more than 1 vinyl group per molecule.

8. A radiation curable oligomer, as described in claim 7, wherein said vinyl mono-hydroxy compound contains at least one acrylate group.

9. A radiation cuable oligomer, as described in claim 8, wherein said radiation sensitive vinyl mono-hydroxy compound is a pentaerthyritol triacrylate.

10. A radiation curable oligomer, as described in claim 8, wherein said radiation sensitive vinyl mono-hydroxy composition comprises a mixture of a hydroxyalkyl acrylate and pentaerthyritol triacrylate.

11. A radiation curable oligomer, as described in claim 1, wherein said epoxy compound is mono-functional and has a molecular weight in the range of about 70 to 250.

12. A radiation curable oligomer, as decribed in claim 11, wherein said vinyl mono-hydroxy compound contains at least 2 vinyl groups per molecule.

13. A radiation curable oligomer, as described in claim 12, wherein said vinyl mono-hydroxy compound contains at least one acrylate group.

14. A radiation curable oligomer, as described in claim 13, wherein said radiation sensitive vinyl mono-hydroxy compound is a pentaerthyritol triacrylate.

15. A radiation curable oligomer, as described in claim 13, wherein said radiation sensitive vinyl mono-hydroxy composition comprises a mixture of a hydroxy alkyl acrylate and pentaerthyritol triacrylate.

* * * * *